United States Patent Office 3,531,396
Patented Sept. 29, 1970

3,531,396
HYDROCRACKING IN THE PRESENCE OF HYDROGEN CONTAINING A MINOR AMOUNT OF CARBON MONOXIDE
Donald A. Messing, Wappingers Falls, and Edward T. Child, Fishkill, N.Y., assignors to Texaco Inc., New York, N.Y., a corporation of Delaware
No Drawing. Filed June 25, 1968, Ser. No. 739,647
Int. Cl. C10g 13/02
U.S. Cl. 208—111                          7 Claims

ABSTRACT OF THE DISCLOSURE

Hydrocarbon oils are hydrocracked in the presence of hydrogen containing a minor amount of carbon monoxide without significant catalyst poisoning by conducting the hydrocracking in the presence of a catalyst comprising sulfided nickel and tungsten supported on a base comprising a zeolite of low alkali metal content.

---

Hydrocracking of petroleum oils has been known for many years and was practiced although not too successfully several decades ago. However, with the development of new catalysts and new operating techniques, it has been improved to the extent that it is now a well established process in the petroleum refining industry. In the hydrocracking of hydrocarbon oils the charge stock is brought into contact with a hydrocracking catalyst at elevated temperatures and pressures in the presence of hydrogen and is thus converted into lighter products.

Conventional hydrocracking catalysts comprise at least two components, a hydrogenating component and a cracking component, the hydrogenating component ordinarily being supported on the cracking component. The hydrogenating component frequently is a Group VIII metal or compound thereof, for example, a noble metal such as platinum or palladium or an iron group metal such as nickel or cobalt. The iron group metal may be used in conjunction with a Group VI metal such as molybdenum or tungsten. When the hydrogenating component comprises a nobel metal, it is generally present in an amount between about 0.1 and 5% by weight of the catalyst composite and preferably between 0.5 and 2%. When the hydrogenating component comprises a Group VIII metal it is generally present in an amount between 5 and 40%, preferably between 8 and 30%. Particularly suitable catalysts are those containing between 0.6 and 0.9 weight percent palladium or 6% nickel and 20% tungsten.

The cracking component of the hydrocracking catalyst may comprise catalysts which ordinarily are used in catalytic cracking units. Such catalysts generally are composed of a mixture of refractory amorphous inorganic oxides such as magnesia, silica, alumina and the like. A mixture containing between 70 and 80% silica and 20 and 30% alumina has attained considerable commercial acceptance. More recently, crystalline zeolites such as zeolite Y have been found to be suitable supports for the hydrogenating component, especially when they have been subjected to an ion exchange treatment to reduce the alkali metal content of the zeolite. As a result of these advances in the catalyst art, perhaps one of the most popular hydrocracking catalysts in commercial use today comprises a nobel metal, because of its excellent hydrogenating activity, supported on a low alkali metal zeolite because of its good cracking activity and also because of its resistance to poisoning by ammonia.

In the early days of commercial hydrocracking, the capacity of the hydrocracking units was so small that the hydrogen demands of the hydrocracker could be met satisfactorily by the amount of by-product hydrogen produced in the catalytic reforming units present in most refineries. Now, however, because of the increased capacity of hydrocracking in most refineries without a corresponding increase in the catalytic reforming capacity, there has been a shortage of hydrogen and it has become necessary to augment the available hydrogen supply by the installation of hydrogen generating units. This increased hydrogen production has been provided by the gasification of hydrocarbons to a synthesis gas composed for the most part of carbon monoxide and hydrogen either by the partial oxidation of hydrocarbons or by the reforming of hydrocarbons with steam. Conventionally the synthesis gas is passed in the presence of steam into contact with a shift conversion catalyst such as iron oxide which results in the production of a gas composed for the most part of hydrogen and carbon dioxide. The carbon dioxide content is reduced to a negligible level by scrubbing for example with aqueous monoethanolamine to yield a gas containing about 96–98% hydrogen and about 2% CO with smaller amounts of other impurities. It has been found necessary when the hydrocracking catalyst is composed of a noble metal supported on low sodium zeolite Y, to subject the scrubbed shifted gas to a treatment such as scrubbing with a cuprous ammonium acetate or cuprous ammonium formate solution or by low temperature fractionation followed by liquid nitrogen wash to remove residual CO to a level below about 50 p.p.m., preferably below 10 p.p.m. because of the poisoning effect of the CO on the hydrocracking catalyst. This treatment for the removal of residual CO adds to the cost of the production of the hydrogen and therefore is economically disadvantageous. In addition, it sometimes happens that the hydrogen purification system becomes upset which results in the introduction into the hydrocracking zone of hydrogen containing an undesirably high content of CO. If the upset is not detected promptly and either corrected or the unit shut down, the situation becomes extremely serious as prolonged operation with hydrogen containing excessive amounts of CO can result in the complete poisoning of the catalyst.

It is therefore an object of the present invention to carry out a hydrocracking process in the presence of a catalyst which is not poisoned by the use of hydrogen containing minor amounts of CO. Another object is to provide a hydrocracking process which can continue to operate when the hydrogen purification system is upset. Still another object of the invention is to provide a combination synthesis gas generation-hydrocracking process in which the CO removal step is omitted. Another object is to produce a high quality naphtha by a hydrocracking process which is conducted in the presence of CO. These and other objects will be obvious to those skilled in the art from the following disclosure.

According to our invention there is provided a process for the hydrocracking of a hydrocarbon oil which comprises contacting the hydrocarbon oil in the presence of hydrogen using a hydrocracking catalyst comprising an iron group metal under hydrocracking conditions, said hydrogen containing at least 50 p.p.m. CO.

Hydrocarbons which may be treated by our process include straight run gas oil, fluid catalytically cracked cycle gas oil, delayed coker gas oil, shale oil, tar sand oil, atmospheric residuum and the like. The charge stock may or may not be subjected to a preliminary hydrotreating to convert sulfur therein to $H_2S$ and nitrogen to $NH_3$. When the charge is so treated, the effluent from the hydrotreating zone depending on the hydrocracking catalyst may be subjected to treatment for the removal of $NH_3$ or may be sent directly to the hydrocracking zone without intermediate treatment. If the catalyst is resistant to nitrogen then the preliminary treating may be dispensed with and the charge may be sent directly into the hydrocracking zone. If the catalyst is sensitive only to organic nitrogen, then the nitrogen-containing charge should be subjected to a preliminary hydrotreating with the effluent being sent directly to the hydrocracking zone. However, if the catalyst is sensitive to nitrogen in any form, then an intermediate separation or treatment for the removal of nitrogen between the hydrotreater and the hydrocracker should be effected.

The hydrogen used in the process of our invention contains at least 50 p.p.m. CO and advantageously does not contain more than about 12–15% CO. Ordinarily it is obtained from a synthesis gas produced by the gasification of hydrocarbon by partial oxidation or by steam reforming to yield a gas composed for the most part of CO and hydrogen which gas is then subjected to a shift conversion in the presence of for example an iron oxide catalyst to produce a gas composed principally of hydrogen and $CO_2$ which latter is removed by scrubbing. The process of our invention is particularly adapted to the use of hydrogen containing 1–15 volume percent CO.

The catalysts used in our process contain two components, a hydrogenating component and a cracking component. The hydrogenating component comprises an iron group metal, for example, nickel or cobalt. In this connection the term iron group metal is intended to include not only the metallic form of the metal but also its compounds such as the oxide or the sulfide. The hydrogenating component is present in an amount between about 5 and 40% by weight of the catalyst composite. When a Group VI metal (including compounds thereof) is used in conjunction with the iron group metal, the latter is present preferably in an amount between about 5 and 15% and the former is present in an amount between 10 and 30%. A particularly suitable catalyst is one in which the hydrogenating component comprises 6% nickel and 20% tungsten by weight based on the catalyst composite.

The cracking component may comprise at least one amorphous inorganic oxide having cracking activity, for example, silica, alumina, magnesia, zirconia and the like which if necessary has been treated with an acidic agent such as hydrofluoric acid to impart cracking activity thereto. A preferred mixture of amorphous inorganic oxides containing 60–90% silica and 10–40% alumina. Hydrocracking catalysts having this type of support are sensitive to nitrogen in any form and the hydrocarbon charged to this catalyst should be subjected to a preliminary hydrotreating to convert the nitrogen present to ammonia which latter should be removed prior to introducing the charge to the hydrocracking zone preferably to a concentration less than 5 p.p.m. nitrogen.

The hydrotreating may be carried out in a manner well known in the art as, for example, by contacting the charge with a cobalt and/or nickel molybdate catalyst on an alumina support at a temperature of about 600–800° F., a pressure of 500–3000 p.s.i.g., a liquid hourly space velocity of 0.5–2 volumes of charge per volume of catalyst per hour and a hydrogen rate of 2000–10,000 standard cubic feet per barrel of charge.

Alternatively the cracking component may be a zerolite of low alkali metal content. Such zeolites may be prepared by subjecting a crystalline zeolite having uniform pore openings of 6–15 angstrom units to ion exchange with a solution of an ammonium compound. The ion exchanged material is then washed, dried and calcined at a temperature sufficient to drive off $NH_3$ to produce a decationized zeolite of reduced alkali metal content, usually of about 2–4%. Hydrocracking catalysts having the decationized zeolite as the cracking component are not effected by ammonia to any appreciable extent but are quite sensitive to organic nitrogen and consequently the charge should be subjected to preliminary hydrotreating to convert the nitrogen present to ammonia. However since the catalyst is not sensitive to ammonia, the entire effluent from the hydrotreating zone may be sent directly without intermediate treatment for the removal of ammonia to the hydrocracking zone.

A particularly preferred cracking component of the catalyst comprises a modified crystalline zeolite and at least one amorphous inorganic oxide, the modified zeolite being present in an amount between about 15 and 60% by weight based on the cracking component. Suitable amorphous inorganic oxides are those displaying cracking activity such as silica, alumina, magnesia, zirconia and beryllia which if necessary have been treated with an acidic agent such as hydrofluoric acid to impart cracking activity thereto. A preferred mixture of amorphous inorganic oxides comprises silica-alumina in a proportion ranging from 65–85% silica and 15–35% alumina.

The modified zeolite portion of the cracking component has uniform pore openings of from 6–15 angstrom units, has a silica-alumina ratio of at least 2.5, e.g. 3–10, and has a reduced alkali metal content. The modified zeolite is prepared by subjecting a synthetic zeolite preferably zeolite Y to ion exchange by contacting the zeolite several times with fresh solutions of an ammonium compound at temperatures ranging for example between about 100 and 250° F. until it appears that the ion exchange is substantially complete. The ion exchanged zeolite is then washed to remove solubilized alkali metal and dried at a temperature sufficiently high to drive off ammonia. This treatment converts the zeolite to the hydrogen form and reduces the alkali metal content to about 2–4 weight percent. The ion exchanged zeolite is then calcined at a temperature of about 1000° F. for several hours. After cooling, the ion-exchanged calcined zeolite is subjected to additional ion exchange by contact several times with fresh solutions of an ammonium compound and again washed and dried. This treatment results in a further reduction in the alkali metal content of the zeolite to less than 1% usually to about 0.5% or less. It would appear that although complete ion exchange has already been effected, yet after the first calcination, it is possible to engage in further ion exchange with the removal of additional alkali-metal ions not removable in the initial ion exchange. Calcination at e.g. 1000–1500° F. may take place here or the calcination may be postponed until after the incorporation of the inorganic oxide and impregnation with the hydrogenating component at which time the composite should be calcined. Whether the calcination is postponed or repeated, the final calcination should not exceed a temperature of 1200° F.

Hydrocracking catalysts containing a hydrogenerating component supported on a cracking component composed of at least one amorphous inorganic oxide and the modified twice ion exchanged, twice calcined zeolite have superior hydrocracking activity and additionally are more resistant to deactivation when brought into contact with nitrogen compounds and polycyclic aromatics. Consequently, hydrocarbon oils containing 20–50 p.p.m. nitrogen charged to such catalysts need not be subjected to preliminary hydrotreating. In fact, such catalysts are not materially poisoned by charge stocks containing 100 p.p.m., 500 p.p.m. or even higher concentrations of nitrogen. The catalysts also show good stability to steam. The hydrocracking catalysts should also be substantially free from rare earth metals and should have a rare earth metal content below 0.5 weight percent, preferably below 0.2 weight percent. It has been found that although rare earth metals are reputed to enhance the activity and stability characteristics of cracking catalysts, their presence in a hydrocracking catalyst is undesirable.

Temperatures within the hydrocracking zone should range between about 600 and 850° F., a preferred temperature range being 650 to 775° F. The pressure should be at least about 500 p.s.i.g., good results being obtained at pressures within the range of 1000 to 3000 p.s.i.g. Liquid hourly space velocities of 0.1–10 volumes of oil per volume of catalyst per hour may be used although space velocities of 0.5 to 2 are preferred. The hydrogen should be introduced to the hydrocracking zone at a rate of at least 1000 standard cubic feet per barrel of oil charge, a practical upper limit being 20,000 s.c.f.b. Advantageously, the hydrogen rate is maintained between 3,000 and 10,000 s.c.f.b.

The following example is submitted for illustrative purposes only and should not be construed as limiting the invention in any manner.

EXAMPLE

In this example a cycle gas oil having the following characteristics is fed directly to the hydrocracking zone.

TABLE I

Distillation range, °F.:

| | |
|---|---|
| IBP—10% | 450–576 |
| 20–30% | 596–612 |
| 40–50% | 622–636 |
| 60–70% | 646–658 |
| 80–90% | 672–694 |
| 95–EP | 718–752 |
| Sulfur, wt. percent | 0.38 |
| Nitrogen, p.p.m | 73 |

The catalyst contains 6% nickel and 15% tungsten supported on a base containing 22% modified (twice calcined, twice ion-exchanged) zeolite, 58% silica and 20% alumina and has a rare earth metal content of less than 0.1%. It is sulfided prior to use. Reaction conditions are maintained constant only the temperature being varied to obtain a 50% conversion to 400° F. and lighter material. Operating and yield data are tabulated below.

TABLE II

| | | | | |
|---|---|---|---|---|
| Temperature, °F | 707 | 709 | 728 | 716 |
| CO in hydrogen, vol. percent | 0 | 5 | 10 | 0 |
| Total hours on stream | 1,229 | 1,335 | 1,555 | 1,660 |
| Hours at CO level | 597 | 54 | 120 | 90 |
| Space velocity, v./v./hr | 0.64 | 0.61 | 0.60 | 0.65 |
| Pressure, p.s.i.g | 1,500 | 1,500 | 1,500 | 1,500 |
| Hydrogen, s.c.f.b | 6,024 | 6,000 | 6,176 | 6,000 |
| Product gravity, °API | 49.0 | 49.9 | 47.0 | 54.4 |
| I.B.P., 215° F., RON [1] plus 3 cc. TEL | 95.6 | 94.9 | 95.4 | 94.5 |
| I.B.P. 215–400° F. | | | | |
| RON [1] plus 3 cc. TEL | 86.3 | 86.5 | 91.1 | 85.8 |
| Paraffins, vol. percent | 28.7 | 28.9 | 24.9 | 33.5 |
| Cycloparaffins, vol. percent | 50.1 | 48.7 | 46.7 | 48.2 |
| Aromatics, vol. percent | 21.1 | 22.4 | 28.2 | 18.3 |

[1] Research Octane Number.

It will be noted from the above that after stabilization at over 100 hours of operation, no harmful effect is to be discerned by using hydrogen containing 5 volume percent CO and that at 10 volume percent CO there is actually an increase in the octane number of the product heavy naphtha. On return to a CO free hydrogen stream, the catalyst returns to its initial activity.

The invention has been described with reference to a specific example. However, it will be obvious to those skilled in the art that various modifications may be made without departing from the spirit and scope thereof, and therefore, only such limitations should be imposed as are indicated in the appended claims.

We claim:

1. In a process for the hydrocracking of a petroleum hydrocarbon oil in which process the hydrogen is contaminated with a minor amount of at least 50 p.p.m. CO, the improvement which comprises carrying out said hydrocracking in the presence of a catalyst comprising sulfided nickel and tungsten supported on a mixture of at least one amorphous inorganic oxide and a crystalline zeolite having uniform pore openings of 6–15 A. and an alkali metal content of not more than about 4% by weight said zeolite being present in the support in an amount between 15 and 60% by weight of the support for a period of at least about 120 hours, said catalyst retaining substantially the same activity throughout said period.

2. The process of claim 1 in which the hydrogen contains between 1 and 15% CO.

3. The process of claim 1 in which the hydrogen contains between about 1 and 10% CO.

4. The process of claim 1 in which the zeolite is a modified zeolite Y prepared by an alternating sequence of at least two ion exchanges and two calcinations.

5. The process of claim 1 in which the zeolite has an alkali metal content of less than 1.0 weight percent.

6. A process for the hydrocracking of a hydrocarbon oil which comprises gasifying a hydrocarbonaceous material to produce a synthesis gas composed mainly of hydrogen and CO, subjecting said synthesis gas to shift conversion to produce a gas composed mainly of hydrogen and $CO_2$ and containing residual CO, scrubbing said shifted gas to remove substantially all of the $CO_2$ and contacting a hydrocarbon oil with the scrubbed shifted gas containing at least 50 p.p.m. CO in the presence of a hydrocracking catalyst comprising as the hydrogenating component sulfided nickel and tungsten supported on a base comprising 15 to 60% by weight zeolite having uniform pore openings of 6–15 A. and an alkali metal content of less than 4 weight percent under hydrocracking conditions for a period of at least about 120 hours, said catalyst retaining substantially the same activity throughout said period.

7. The process of claim 6 in which the scrubbed shifted gas contains between 1 and 15% CO.

References Cited

UNITED STATES PATENTS

| | | | |
|---|---|---|---|
| 2,098,400 | 11/1937 | Pier et al. | 208—108 |
| 2,358,879 | 9/1944 | Redcay | 208—111 |
| 3,033,778 | 5/1962 | Frilette | 208—120 |

DELBERT E. GANTZ, Primary Examiner

A. RIMENS, Assistant Examiner

U.S. Cl. X.R.

208—108; 252—455